W. R. UHLEMANN.
EYEGLASS MOUNTING.
APPLICATION FILED MAR. 19, 1917.
1,311,543.
Patented July 29, 1919.
2 SHEETS—SHEET 1.
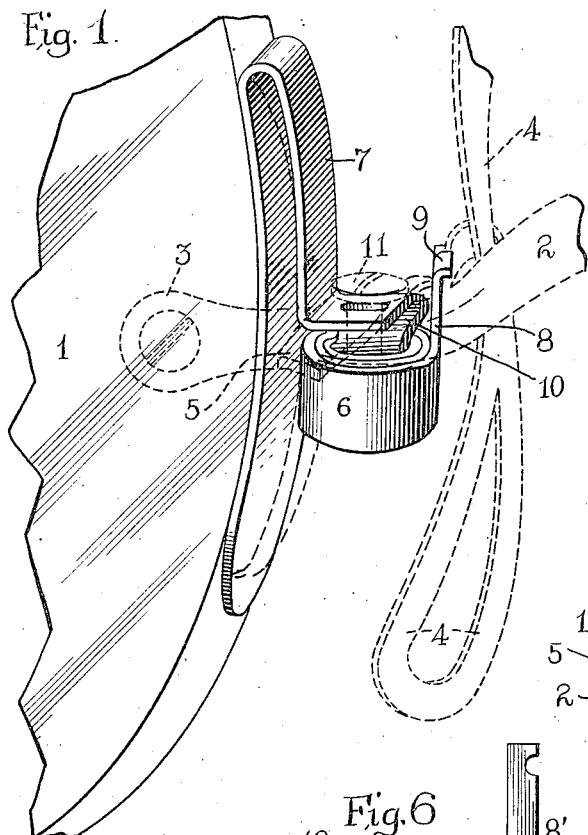
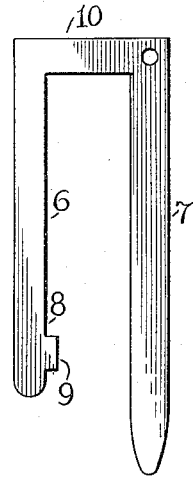
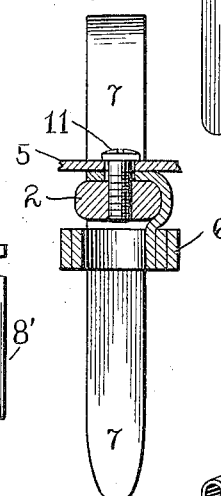
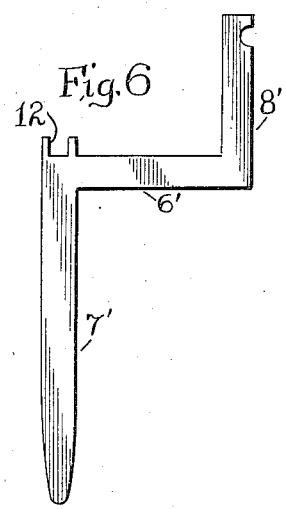
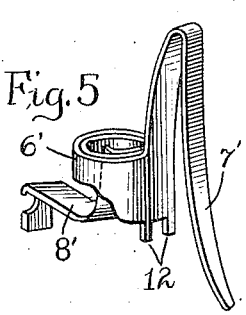
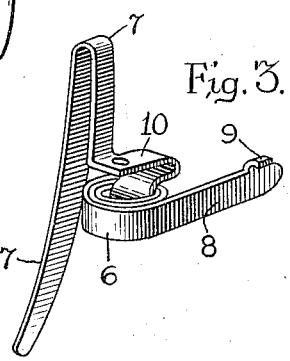
Witnesses:
Wm M. Haenel
Inventor
William R. Uhlemann
By Robert Pume
Attorney.

W. R. UHLEMANN.
EYEGLASS MOUNTING.
APPLICATION FILED MAR. 19, 1917.
1,311,543.
Patented July 29, 1919.
2 SHEETS—SHEET 2.
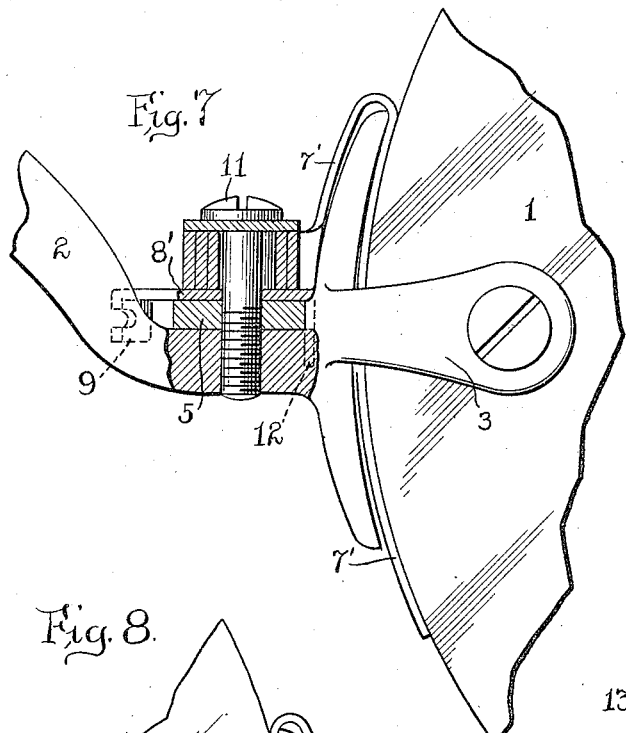
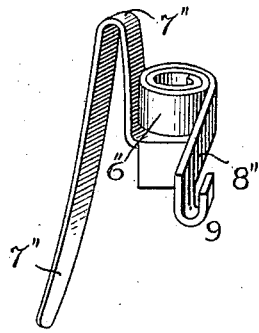
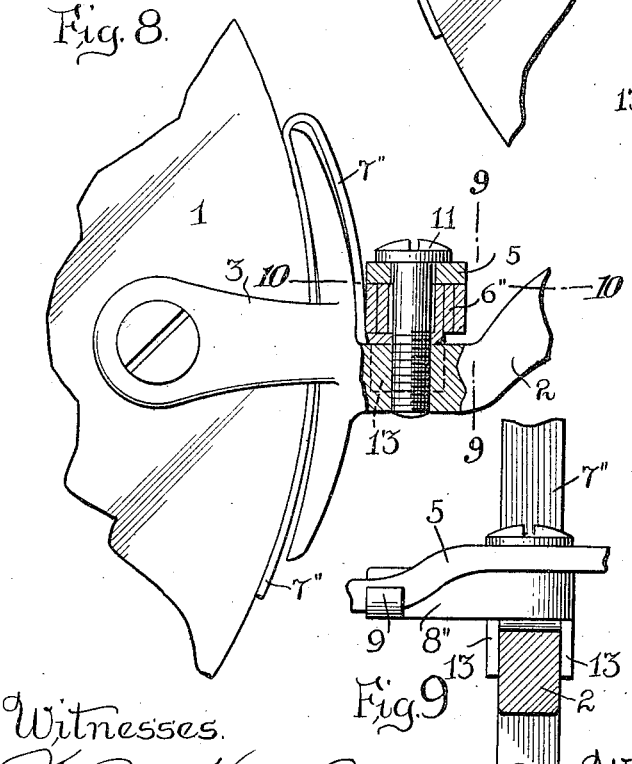
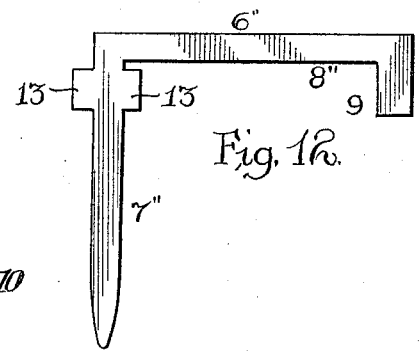
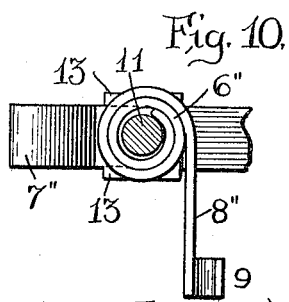
Witnesses.
Inventor:
William R. Uhlemann.
By Robert Purves
Attorney.

UNITED STATES PATENT OFFICE.

WILLIAM R. UHLEMANN, OF CHICAGO, ILLINOIS.

EYEGLASS-MOUNTING.

1,311,543.  Specification of Letters Patent.  Patented July 29, 1919.

Application filed March 19, 1917. Serial No. 155,863.

*To all whom it may concern:*

Be it known that I, WILLIAM R. UHLEMANN, a citizen of the United States of America, and a resident of Chicago, in the county of Cook, State of Illinois, have invented certain new and useful Improvements in Eyeglass-Mountings, of which the following is a specification.

This invention relates to that class of eyeglass-mountings generally known in the art as finger-piece mountings and in which the nose grips are carried on spring impelled levers capable of retraction by the fingers of the user.

And the present improvement has for its object, to provide a simple and efficient structural formation of parts in which the brace for resiliently holding an eyeglass lens in proper position in the mounting, has an integral formation with the operating spring of the carrying lever of a nose grip, and with which increased resiliency in the parts can be attained in a practical and economical manner, and a structure provided having both compactness of arrangement and durability against normal wear and stresses to which an eyeglass is ordinarily exposed. All as will hereinafter more full appear.

In the accompanying drawings:—

Figure 1, is a detail perspective view, illustrating the lever actuating spring and associated resilient lens brace, with portions of a lens, rigid bridge lens attaching straps, lever and nose grip, shown in dotted lines.

Fig. 2, is a detail transverse section on a line with the attaching screw of the combined spring, lens brace, and lever, to an end part of the bridge.

Fig. 3, is a detail perspective view of the combined actuating spring and resilient lens brace, in a detached condition.

Fig. 4, is an elevation of the blank from which spring and brace shown in Figs. 1, 2 and 3, are formed.

Fig. 5, is a detail perspective view of a modified form of the combined actuating spring and resilient lens brace of the present improvement.

Fig. 6, is an elevation of the blank from which the modified structure shown in Fig. 5 is formed.

Fig. 7 is a vertical section, with parts in elevation of the modified structure illustrated in Figs. 5 and 6.

Fig. 8 is a vertical section, with parts in elevation, illustrating another modified form of the invention.

Fig. 9, is a transverse section on line 9—9, Fig. 8.

Fig. 10, is a horizontal section on line 10—10, Fig. 8.

Fig. 11, is a detail perspective view of the actuating spring and resilient lens brace shown in Figs. 8, 9 and 10.

Fig. 12, is an elevation of the blank from which the combined actuating spring and resilient brace shown in Fig. 11, is formed.

Similar reference numerals indicate like parts in the several views.

Referring to the drawings, 1 designates a portion of a lens of a rimless eyeglass, and 2 a portion of the rigid bridge or arch by which a pair of eyeglass lenses are connected together in proper spaced relation by clips or straps 3 on the ends of the bridge 2, in connection with the resilient lens braces hereinafter described.

4 designates one of the nose grips of the mounting, carried on the inner end of an operating lever 5, pivoted near its mid-length to a side portion of the bridge 2, and adjacent to a clip or strap 3. The outer end of said lever 5 extends forward of the mounting for manual actuation by the finger of the user, as usual in the present type of mountings.

The general construction and association of parts above described, is common in the art, and the present improvement involves in connection therewith, a novel integral formation and combination of the resilient lens brace with the actuating spring aforesaid, and in the preferred form of the present invention shown in Figs. 1, 2 and 3, and 4 comprises as follows:

6 designates a coiled strip spring, preferably of the close spiral formation shown, one end of which has an integral extension adapted to be formed into a resilient lens brace 7 of approximately the form shown and claimed in my prior Patent No. 933,502, dated September 7, 1909; while the other end of the spring 6 has an integral tangentially arranged extension or arm 8, the free end or terminal portion of which has operative engagement with the inner portion of the carrying lever 5 of a nose grip, by an engaging flange 9 or other usual means of connection. And a material feature of the present improvement in connection with the aforesaid arrangement of parts, comprises an integrally formed U shape member 10, arranged between the spring portion 6 and the brace portion 7 to provide an open sided recess in the structure for the reception of a horizontal side portion of the bridge 2, and in addition to such formation and arrangement of parts the connection of said U shape member 10, spring portion 6 and brace portion 7 in proper position by the headed pivot screw 11 of the nose grip carrying lever 5. The said screw 11 passes down through a pivot orifice in said lever 5, through a companion orifice in the top web of said U shaped member 10, and screws into a screw-threaded orifice in the bridge end, as illustrated in Fig. 2.

The structure above described involves the location of the spring member 6 in a plane beneath the bridge 2. My invention however embraces a construction in which said spring member is located above the said bridge 2 and nose grip carrying lever 5, as illustrated in Figs. 5, 6 and 7, in which:—

6' designates a coiled strip spring, similar to that above described, and from the outer convolution of which extends the resilient lens brace 7' as shown, and as heretofore described.

8' designates an integrally formed tangentially extending arm on the spring 6' and adapted for resilient operative engagement with the nose grip carrying lever 5, and having integral connection with the inner convolution of the coiled spring 6' aforesaid.

12 designates a pair of depending spaced prongs, preferably in alined relation to the lens brace 7' aforesaid, and adapted to engage over the bridge 2, as shown, and attach the outer convolution of the spring member 6' against rotative stress. In this modified structure the headed pivot screw 11, by which the nose grip carrying lever 5 is pivotally attached in place, acts to prevent a shifting movement in a horizontal plane of the spring member 6' aforesaid.

This invention also embraces a construction in which the above described spring member is located above the aforesaid bridge 2, and intermediate of the bridge and the nose grip carrying lever 5, as illustrated in Figs. 8 to 12, inclusive, and in which:—

6" designates a coiled strip spring, similar to that heretofore described, and from the inner convolution of which extends the resilient lens brace 7" as shown, and as heretofore described.

8" designates an integrally formed and tangentially extending arm on the spring 6" and adapted for operative engagement with the nose grip carrying lever 5, and having integral connection with the outer convolution of the spring member 6" aforesaid.

13 designates a pair of depending spaced prongs or flanges, formed integrally with the front and rear of the connecting web between the resilient brace 7" and the inner convolution of the spring 6" and adapted to engage over the bridge 2 as shown, and attach the inner convolution of the spring 6" against rotative stress. In this modified structure the headed pivot screw 11 by which the nose grip carrying lever 5 is pivotally attached in place, also acts to prevent a shifting movement in a horizontal plane of the spring member 6" aforesaid.

Having thus fully described my said invention what I claim as new and desire to secure by Letters Patent, is:—

1. In a finger piece eyeglass mounting, an operating spring comprising a coiled strip spring, one convolution of which has a tangential extension adapted for operative engagement with a nose grip carrying lever, another convolution of which is formed with a bridge engaging formation, one of the convolutions of the spring having an extension bent to form a resilient brace for an eyeglass lens, substantially as set forth.

2. In a finger piece eyeglass mounting, an operating spring comprising a coiled strip spring, the outer convolution of which has a tangential extension adapted for operative engagement with a nose grip carrying lever, and the inner convolution of which is formed with a bridge engaging formation, said inner convolution having an extension bent to form a resilient brace for an eyeglass lens, substantially as set forth.

3. In a finger piece eyeglass mounting, an operating spring comprising a coiled strip spring, the outer convolution of which has a tangential extension adapted for operative engagement with a nose grip carrying lever, and the inner convolution of which has an extension formed into a bridge engaging U shape portion and into a resilient brace for an eyeglass lens substantially as set forth.

Signed at Chicago, Illinois, this 17th day of March, 1917.

WILLIAM R. UHLEMANN.